UNITED STATES PATENT OFFICE.

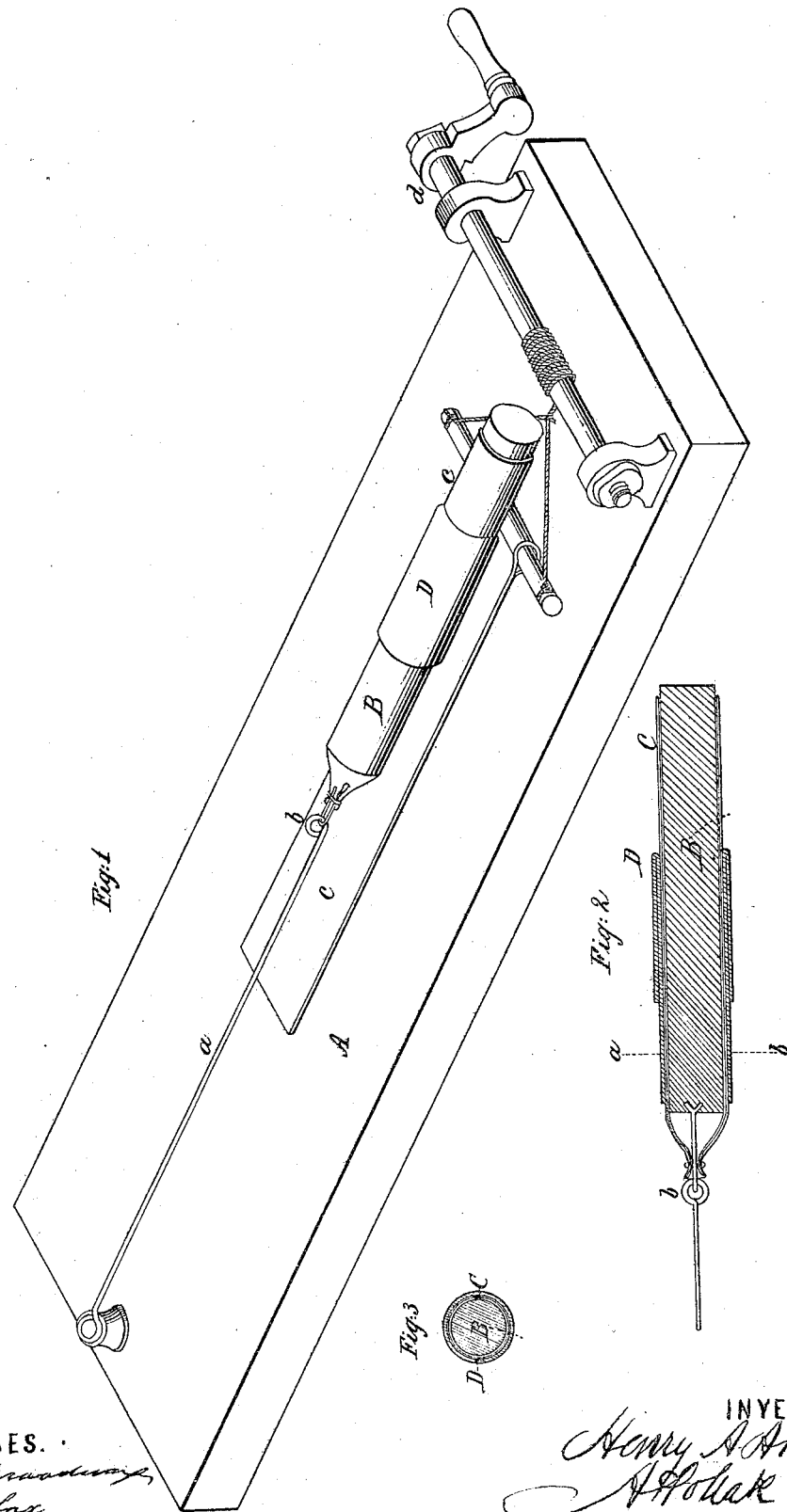

HENRY A. ALDEN, OF MATTEAWAN, NEW YORK, ASSIGNOR TO NEW YORK RUBBER COMPANY, OF NEW YORK, N. Y.

WATERPROOF HOSE.

Specification of Letters Patent No. 30,032, dated September 18, 1860.

*To all whom it may concern:*

Be it known that I, HENRY A. ALDEN, of Matteawan, in the county of Dutchess and State of New York, have invented a certain new and useful Improvement in the Manufacture of Waterproof Hose or Tubing; and I do hereby declare that the following, taken in connection with the accompanying drawing, which forms part of this specification, is so full and clear a description as to enable others skilled in the manufacture of waterproof hose to make and use this my improvement.

My improvement has reference to the manufacture of flexible tubing or hose, suitable for fire engine and other purposes, in which a waterproof lined or coated lapped flexible tube has combined with it a waterproof lined or coated woven flexible tube.

My present method of manufacturing hose of the character above referred to, essentially differs from the method I have previously described in Letters Patent of the United States and which previous method was substantially as follows: A woven flexible tube was first coated on its exterior surface with india rubber or other waterproof solution, compound or material, and then said coated close tube laid on a woven strip similarly coated on its under side, which strip was lapped round the woven tube and its edges cemented together and the two tubes thus united subsequently turned inside out. To such method there are under certain circumstances or for particular purposes, some objections. Thus, the turning of both tubes inside out is apt to buckle or separate the tubes in places, destroying their adhesion or binding solidity at parts, and creating air or vacant cavities between them, also exposing the solution or waterproof coating to crack and rupture and in case of leakage through the one tube making the other tube fail to protect it at the point of leakage and subjecting both to leakage. It is also difficult or impossible under such a method of manufacture, to make a compound tube of comparatively small diameter. These and other objections are removed by my present improvement and a more perfect and different character of combined lapped and close or woven tube is produced, one in which the inner or lapped tube needs no turning inside out and in which the two tubes are not cemented together if it is desired they should adhere, till after the turning is effected. The adhesion too of the one tube with the other may be made more perfect by the mode of slipping on the one tube over the other, and, as it is only the circular woven covering or tube that requires to be turned, there is no limit to the thickness and strength of the hose, the inner or lapped tube being made of any number of plies or wrappers.

While not confining myself to any particular apparatus or machinery for the manufacture of this improved flexible tubing or hose, and while cognizant that various changes, without departure from the principle of the improvement, may be made in its manufacture, the following, by way of illustration will suffice to show how my invention is or may be carried out.

Figure 1, of the accompanying drawing represents a view in perspective of an apparatus suitable for the manufacture of my improved hose, with a section only of the mandrel employed and sections of the lapped and close tubes thereon as during the process of manufacture. Fig. 2 represents a longitudinal section of the close or woven and lapped tubes in the process of manufacture on the mandrel; and Fig. 3, a transverse section of said tubes after they are taken from the mandrel.

I take, for instance, a strip or strips of cotton hemp or other woven fibrous material, of the length of the hose required and of suitable breadth, and coat the same on one or both sides with gutta percha, india rubber or their compounds or equivalents, either with or without sulphur, or any other suitable waterproof solution or substance. This flexible strip I lay on a table (A) and place upon the strip a rod or mandrel (B) of suitable diameter and convenient length and wrap the strip around the mandrel, and afterward lap and cement the joint of the tube so formed. If said tube (C) be only coated on one side, then the coated side may either be arranged innermost or outermost as desired, but, in order to illustrate how perfect an adhesion may here be made with the close or woven tube (D) it is preferred to speak of the lapped tube (C) as coated, if not on both sides, at least, on its exterior surface, and the close or woven tube as similarly or otherwise suitably covered with a waterproof coating either on both sides or at least on its exterior surface before being turned inside out, though this disposition of the coating may be reversed.

Where great strength of hose is required, additional plies or wrappers of duck, cloth or other woven material coated on one or both sides, may be lapped around the inner tube (C) before slipping on the circular woven covering or outer tube (D). The waterproof coated close or woven tube (D) of suitable diameter to form a tight fit to the lapped tube or tubes, is then passed up or along and around a chain or rod (a) made fast at its one end and serving to admit the one extremity of the lapped tube (C) being hitched to it at the other end. Thus secured the hitching end of the lapped tube may be tied or drawn tight around the end of the mandrel (B) and, if desired, the bottom or nearest end of the close or woven tube lying around the rod (a) be similarly secured and by the same means at the same place (b). The outer covering or woven tube (D) is then slipped over the lapped tube (C) by gradually turning it inside out and drawing it down or along over the lapped tube, when the whole is rolled down to make perfect the union of the two tubes and the mandrel removed.

Soapstone or any other suitable material may be rubbed on or applied to the mandrel to prevent the tube sticking to it.

To facilitate the drawing down or over of the close tube, a messenger or strip of cloth (c) may be wound in a spiral manner around the outer tube to form a good hold for the hands of the operator, and said messenger made fast at its one end to a windlass (d) that, on being turned, will assist in drawing down the outer or woven tube.

To perfect the union of the two tubes, they may, if desired, after removal from the mandrel, be closed at their ends, and air or water be forced into the hose till a heavy pressure be effected.

The waterproof coating on the outer tube need only be thin, so that there will be but little risk of it cracking or opening by the turning of the tube, and the coating of the inner tube not having been disturbed by turning, will cover any break, should the same occur in the outer tube by the turning of it.

I, in no way, restrict my improvement to any particular description of waterproof coating to the tubes. Waterproof cloth or sheets of rubber, guttapercha or their or other compounds, may take the place of a solution applied to the surface or surfaces of the tubes; the effect, so far as the principle of my present improvement is concerned, being substantially the same. If rubber be used, vulcanization may be resorted to or not, as preferred.

I claim, as my present improvement—

Making flexible tubing or hose, by first lapping around a mandrel or its equivalent a strip or strips of flexible material lined or coated on one or both sides with an india rubber or other cementing substance and then drawing on or over the same a similarly coated close or woven tube, substantially as described.

In testimony whereof I have signed my name to this specification before two subscribing witnesses.

H. A. ALDEN.

Witnesses:
J. N. WEED,
W. H. GERARD.